Figure 1:
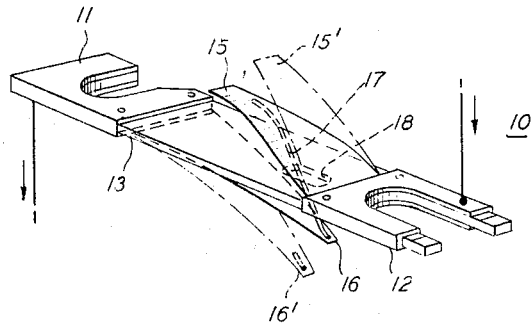

Nov. 29, 1966   G. W. WELLS   3,289,080
FUSE ARRAY MAXIMUM CURRENT INDICATOR
Filed Jan. 21, 1964

INVENTOR
G. W. WELLS
BY
Roderick B Anderson
ATTORNEY

United States Patent Office 3,289,080
Patented Nov. 29, 1966

3,289,080
FUSE ARRAY MAXIMUM CURRENT INDICATOR
George W. Wells, Lincroft, N.J., assignor to Bell Telephone Laboratories, Incorporated, New York, N.Y., a corporation of New York
Filed Jan. 21, 1964, Ser. No. 339,206
6 Claims. (Cl. 324—103)

This invention relates to maximum current indicators, and more particularly, to devices for giving a permanent indication of the maximum electrical current which has been delivered to a load at any time over a relatively long time period.

When certain electrical loads such as private branch telephone exchanges are installed, it is important to predict the maximum current that they will require in order to determine the proper size of the input current facilities. One method of making this determination is to attach a recording ammeter between the input and the load to record permanently the current input to the load over an extended time period, as for example, two weeks. Such recording ammeters are normally fairly expensive and they require some monitoring and maintenance. For example, rolls of paper, which must be periodically replaced, are typically used as the recording medium. A conventional ammeter, which includes an indicating needle superimposed on an ampere scale, could probably be modified for this purpose by making the needle non-retractable, but this would be relatively expensive to develop and manufacture. Moreover, for design purposes it is generally necessary to determine the maximum steady-state current, rather than transient current; ammeters must therefore be provided with well-designed damping mechanisms to avoid misleading indications of high transient currents.

It is an object of this invention to provide a simple and inexpensive maximum current indicator.

It is another object of this invention to provide a maximum current indicator that does not require periodic monitoring or maintenance.

My invention is based partly on the observation that the design of most installations requires only an approximation of future current demands. This is because in such situations the designer need only choose the smallest and least expensive of several available input facilities each of which has a discrete maximum current rating. For example, if the maximum current requirements of a given load were judged to be more than 15 and less than 20 amperes, and if the maximum current capacities of several available input facilities were 10, 15, 20, and 25 amperes, respectively, the designer would normally choose the facilities having a capacity of 20 amperes. Only an approximation would be required in making this choice, and a knowledge of the precise maximum current demand of the load would not be necessary.

The objects of my invention are attained in one embodiment thereof which comprises a number of fuses of progressively higher current rating which are connected in series between the current source and the load. Each fuse is designed to short-circuit itself automatically when it blows as a result of current flow in excess of its rating. Hence, the rating of the largest fuse that has blown over a given time period is indicative of the maximum current flow through the device during that period. For example, if the 10- and 15-ampere fuses have blown but the 20-ampere fuse has not blown, it can be inferred that the maximum current through the circuit has been between 15 and 20 amperes.

The fuses used in this embodiment comprise two conductive leaf springs held in a taut condition by a fuse wire which becomes severed when the current therethrough exceeds its rated capacity. A conductive extension from the first leaf spring extends to a point closely adjacent the second leaf spring so that when the fuse wire is severed, the second spring comes into contact with the extension. Hence, in its normal condition the fuse conducts current through the first leaf spring, the fuse wire and the second leaf spring; when the fuse is blown, current is conducted through the extension and the second leaf spring so that the fuse is effectively short-circuited. Fuses of this type are normally insensitive to transient currents, so that the current approximations desirably reflect maximum steady-state currents.

Another embodiment of my invention makes use of the same type of fuse, but the fuses are not connected in series. As before, all of the fuses are arranged in succession with each successive fuse having a progressively higher maximum current rating. The first leaf spring of the first fuse is connected to the current source and all of the second leaf springs of the fuses are connected to the load. A conductive extension on all of the fuses except the first fuse extends from the input terminal of the fuse to a point in proximity to the first leaf spring of the preceding fuse. Hence, when any of the fuses blow, the first leaf spring comes into electrical contact with the input terminal of the succeeding fuse, thereby effectively bypassing the blown fuse. This arrangement is advantageous because at any given time the electrical current is conducted through only one fuse. For example, the current initially flows from the source through the fuse wire of the first fuse to the load. If the first fuse blows, the current is conducted through only the second fuse by way of the first leaf spring of the first fuse and the conductive extension of the second fuse. Again, a permanent indication of the maximum current delivered to the load is gained by noting the current rating of the largest fuse which has blown.

Figure 2:
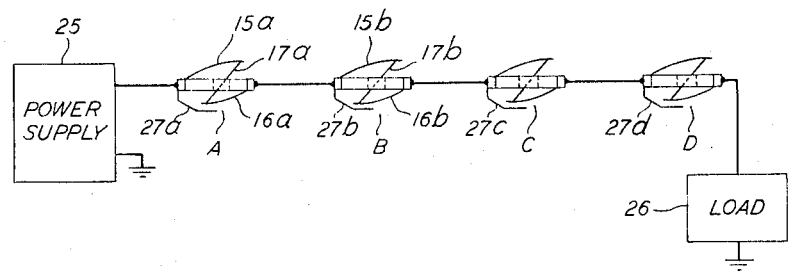
Figure 3:
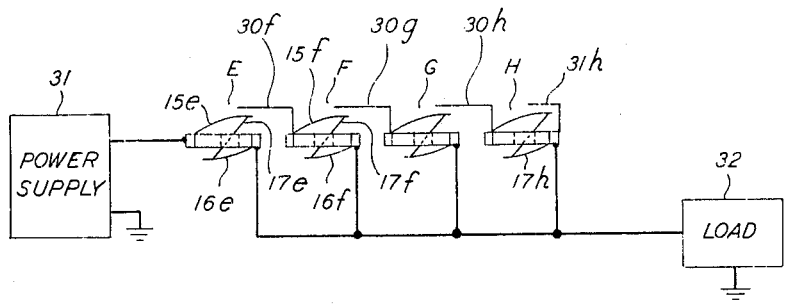
Figure 4:
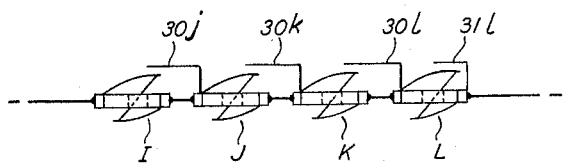

These and other objects and features of the invention will be more clearly understood from a consideration of the following detailed description taken in conjunction with the accompanying drawing in which:

FIG. 1 is a perspective view of a fuse device;
FIG. 2 is a schematic illustration of one embodiment of the invention;
FIG. 3 is a schematic illustration of another embodiment of the invention; and
FIG. 4 is a schematic illustration of still another embodiment of the invention.

Referring now to FIG. 1, there is shown a fuse device 10 comprising two opposite conductive terminals 11 and 12 separated by an insulator 13. Attached to one terminal 12 is a conductive leaf spring 15 and attached to the other terminal 11 is a second conductive leaf spring 16. The two leaf springs are held together in a taut condition by a fuse wire 17 which extends through an aperture 18 in the insulator 13. Terminal 12 may act as an input terminal in which case current would normally be conducted through the first leaf spring 15, the fuse wire 17, the second leaf spring 18 and out through the output terminal 11 as shown by the arrows.

The maximum rated capacity of the fuse is determined by the size of fuse wire 17, which is constructed in a known manner to melt and become severed when the current therethrough exceeds some predetermined maximum level. When the fuse wire severs, the leaf springs are released and they spring apart to the positions 15' and 16' which are shown in phantom. For example, if the fuse is intended to be used as a 5 ampere fuse, the fuse wire 17 is chosen such that it will sever when the current exceeds 5 amperes, thereby causing the leaf springs 15 and 16 to assume the positions 15' and 16', respectively. However, the fuse wire will not normally sever if the current excess is a transient current. Fuses of the type shown in FIG. 1 are commercially available and are sold by the Western Electric Company under the identification "No 35-type Fuses."

Fuses of the type shown in FIG. 1 can be modified and connected into a circuit in accordance with my invention to give an approximate indication of the maximum current which has flowed through the circuit at any time within a predetermined time period. One embodiment of the invention, shown in FIG. 2, comprises a series of fuses A, B, C, and D which are connected between a power supply 25 and a load 26. The fuses A through D are basically identical to fuse 10 of FIG. 1 except for the inclusion of conductive lateral extensions 27a through 27d. These extension are electrically connected to the first leaf springs 15a through 15d respectively, and extend to a point adjacent each of the corresponding second leaf springs 16a through 16d.

The fuses may be arranged in order of their maximum current capacities with the smallest fuse being connected to the power supply and the largest fuse being connected to the load. For example, fuse A may be rated at 10 amperes, fuse B at 15 amperes, fuse C at 20 amperes, and fuse D at 25 amperes. When the current delivered by the power supply to the load exceeds 10 amperes, fuse wire 17a severs, causing the second leaf spring 16a to make contact with conductive extension 27a. Thereafter, current flows from the power supply to fuse B through extension 27a and second leaf spring 16a. If at some subsequent time the current should exceed 15 amperes, fuse wire 17b would sever, causing leaf spring 16b to come into contact with conductive extension 27b. Current would then bypass fuses A and B and flow through fuses C and D. If the current were to exceed 20 amperes, fuse C would blow, and if it exceeded 25 amperes fuse D would blow. After an extended time period one may therefore observe the rated value of the highest fuse which has blown and thereby approximate the maximum current which has flowed through the circuit during the time period.

The device of FIG. 2 is particularly advantageous for determining which of several available input facilities are required for delivering current to load 26. Suppose, for example, input facilities are available for delivering maximum current loads of 10, 15, 20, and 25 amperes, respectively. If after a suitable time period it is discovered that fuse B has blown but that fuse C is not blown, it can be inferred that input facilities having a maximum current rating of 20 amperes would be sufficient for delivering current to load 26. If other input facilities were available, other fuse values corresponding to the maximum current ratings of these facilities would alternatively be used in the circuit of FIG. 2. Since the fuses of FIG. 2 are connected in series it is not technically necessary that they be connected in order of their current values, since current will flow through each fuse of the circuit until that particular fuse blows.

Another embodiment of the invention, shown in FIG. 3, comprises a series of fuses E, F, G, and H, each of which are identical to the fuse of FIG. 1 with the exception of conductive extensions 30f, 30g, 30h, and 31h. Extensions 30f through 30h are connected to the first leaf spring of fuses F, G, and H and extend toward the first leaf spring of the preceding fuse. Extension 31h is connected to second leaf spring of fuse H and extends toward the first leaf spring of fuse H. The first leaf spring of fuse E is connected to a power supply 31, while the second leaf springs of all of the fuses are connected to a load 32. It is necessary in the arrangement of FIG. 3 that all of the fuses be arranged in order of their maximum current rating. For example, fuse E has a rating of 10 amperes; fuse F, 15 amperes; fuse G 20 amperes; and fuse H, 25 amperes. When the current delivered by the power supply exceeds 5 amperes, fuse wire 17e severs, thereby causing the first leaf spring 15e to come into contact with conductive extension 30f. Thereafter, current is delivered to the load by way of first leaf spring 15e, extension 30f, first leaf spring 15f, fuse wire 17f and second leaf spring 16f, thereby bypassing fuse E. Likewise, if fuse F blows, it is automatically bypassed and the current is transmitted to the load by way of fuse G. If all of the fuses blow, they are all bypassed and current is conducted to load 32 by way of conductive extension 31h. Again, by observing the highest fuse which has blown, one can approximate the maximum current that has been delivered by the power supply to the load over a given time period.

The embodiment of FIG. 3 has the advantage that at any given time current is conducted through only one fuse. When that particular fuse is blown, current is conducted only through the successive fuse. If each of the fuse wires has the same resistance, as for example, .5 ohm, then the resistance between the power supply 31 and the load 32 does not change when any of the fuses therebetween may blow. With .5 ohm fuses, the total resistance at any time in the device of FIG. 3 is substantially .5 ohm, while in the device of FIG. 2, the initial total resistance would be 2 ohms with this resistance being reduced with each blown fuse.

A cursory examination of FIGS. 2 and 3 shows that maximum current indicators are provided which are inherently easy to assemble and use. The fuses shown in FIG. 1 are currently commercially available for sums which are nominal by comparison to conventional ammeters, and especially recording ammeters. The fuses are easily modified by adding the conductive extensions, and simple holders for the fuses can be constructed in any of numerous ways at small cost. It should be noted that, with the modifications provided, each of the simple fuses acts as electrical relays when the fuse wire is severed. Various other fuses could be devised using spring-biased means to likewise make the fuse act as a relay when the current therethrough exceeds its rated capacity. FIG. 4, for example, shows an alternate form of series connection, comprising fuses I, J, K, and L, which could be substituted for that shown in FIG. 2. The conductive extensions 30j, 30k, 30l and 31l are attached to the fuses in the same manner as in FIG. 3. Various other modifications may be made by those skilled in the art without departing from the spirit and scope of the invention.

What is claimed is:
1. In combination:
an electrical current source;
a load electrically coupled to the source;
means for giving a permanent indication of the approximate maximum current delivered by the source to the load comprising an array of fuses;
the first fuse of the array having a low current rating and the last fuse having a high current rating, with each successive intermediate fuse therebetween having progressively higher maximum current ratings;
the first fuse of the array being electrically connected to the source and the last fuse being connected to the load;
each fuse comprising a conductive leaf spring and a second conductor;
means for electrically bypassing each fuse comprising a third conductor adjacent to each leaf spring;
means for conducting current through the fuse and for mechanically biasing the leaf spring away from the third conductor comprising a fuse wire in each fuse interconnecting the leaf spring with the second conductor;
said leaf spring, fuse wire, and second conductor of each fuse comprising a first current transmission path through the fuse;
each of said fuse wires having the characteristic of becoming severed when the current therethrough substantially exceeds the rated maximum capacity for the fuse, whereby the leaf spring is released and makes electrical contact with the third conductor;

each leaf spring and third conductor together comprising a second transmission path for conducting electrical current to the next successive fuse of the array when the adjacent leaf spring comes into contact with said third conductor.

2. A maximum current indicator comprising:

a series of fuses of successively higher maximum current rating;

each fuse comprising first and second conductors interconnected by a fuse wire which severs when the current therethrough substantially exceeds its rated capacity;

the second conductor of each fuse being electrically connected to the first conductor of the succeeding fuse;

means responsive to the severance of the fuse wire of each fuse for electrically interconnecting the first conductor of said fuse to the first conductor of the successive fuse;

said last-mentioned means comprising a third conductor in juxtaposition with the second conductor;

said second conductor being spring-biased toward the third conductor in opposition to the fuse wire, whereby the second conductor makes physical contact with the third conductor upon severance of the fuse wire.

3. A maximum current indicator comprising:

a plurality of fuses electrically connected in series;

said fuses each having different current ratings;

each fuse comprising first and second conductive leaf springs held in a taut condition by a fuse wire;

said first and second conductor leaf springs and the fuse wire defining a first current transmission path through the fuse;

the second leaf spring of each fuse being conductively connected to the first leaf spring of the succeeding fuse;

a conductive extension electrically connected to the first spring of each fuse and extending toward the second spring;

each second spring being arranged to make contact with its corresponding conductive extension upon the severance of the fuse wire, whereby the fuse short-circuits itself when electrical current therethrough substantially exceeds its rated capacity.

4. In combination:

a current source;

a load;

means for giving a permanent indication of the maximum current delivered by the source to the load comprising an array of fuses, each of different current rating, connected between the source and the load;

each fuse comprising first and second conductors interconnected by a fuse wire which severs when the current therethrough exceeds its rated capacity;

the first and second conductor and the fuse wire of each fuse comprising a first transmission path through the fuse;

the first conductor of a first fuse of the array being directly connected to the source;

all of the second conductors being connected in parallel to the load;

all of the fuses except the first fuse having a conductive extension connected to the first conductor which extends to a point adjacent the first conductor of the preceding fuse of the array;

the last fuse having a conductive extension connected to the second conductor which extends to a point adjacent the first conductor of the last fuse;

each of said first conductors being spring biased toward its respective adjacent conductive extension in opposition to the fuse wire, whereby each first conductor makes physical contact with the conductor extension upon severance of its respective fuse wire.

5. In combination:

a current source;

a load;

means for giving a permanent indication of the maximum current delivered by the source to the load comprising an array of fuses, each of different current rating, connected between the source and the load;

each fuse comprising first and second conductors interconnected by a fuse wire which severs when the current therethrough exceeds its rated capacity;

the first and second conductors and the fuse wire of each fuse comprising a first transmission path through the fuse;

the first conductor of a first fuse of the array being connected to the source, the second conductor of the last fuse of the array being connected to the load;

the second conductors of all but the last fuse being connected to the first conductor of the succeeding fuse of the array;

all of the fuses except the first fuse having a conductive extension connected to the first conductor which extends to a point adjacent the first conductor of the preceding fuse of the array;

the last fuse having a conductive extension connected to the second conductor which extends to a point adjacent the first conductor of the last fuse;

each of said first conductors being spring biased toward its respective adjacent conductive extension in opposition to the fuse wire, whereby each first conductor makes physical contact with the conductive extension upon the severance of its respective fuse wire.

6. A maximum current indicator comprising:

an array of fuses, each of different higher maximum current rating;

each fuse comprising first and second conductors interconnected by a fuse wire which severs when the current therethrough substantially exceeds its rated capacity;

the second conductor of each fuse being electrically connected to the first conductor of the succeeding fuse;

means responsive to the severance of the fuse wire of each fuse for interconnecting the first conductor of said fuse to the first conductor of the successive fuse;

said last-mentioned means comprising a third conductor in juxtaposition with the second conductor;

said second conductor being spring-biased toward the third conductor in opposition to the fuse wire, whereby the second conductor makes physical contact with the third conductor on severance of the fuse wire.

References Cited by the Examiner

UNITED STATES PATENTS 2,006,179 6/1935 Price et al. _____ 340—253
3,190,987 6/1965 Fister _____ 200—117 X WALTER L. CARLSON, *Primary Examiner.*

G. L. LETT, *Assistant Examiner.*